United States Patent [19]

Warner, II

[11] Patent Number: 4,619,954

[45] Date of Patent: Oct. 28, 1986

[54] FIBERGLASS REINFORCED PLASTIC SHEET MATERIAL WITH FIRE RETARDANT FILLER

[75] Inventor: Sidney O. Warner, II, Bolivar, Tenn.

[73] Assignee: Sequentia, Incorporated, Strongsville, Ohio

[21] Appl. No.: 623,405

[22] Filed: Jun. 22, 1984

[51] Int. Cl.⁴ ............... C08K 7/16; C08K 9/06; C08L 67/00; C08L 67/06
[52] U.S. Cl. ................... 523/516; 428/98; 428/288; 428/292; 428/482; 523/527; 523/514
[58] Field of Search .......... 524/539; 523/527, 514, 523/516; 428/289, 296, 98, 288, 292, 482

[56] References Cited

U.S. PATENT DOCUMENTS

| | | | |
|---|---|---|---|
| 2,782,544 | 2/1957 | Tobin | 41/21 |
| 2,931,117 | 4/1960 | Bosworth | 40/135 |
| 3,461,012 | 8/1969 | Wicker | 156/62.2 |
| 3,751,319 | 8/1973 | Green | 156/242 |
| 3,775,165 | 11/1973 | Young et al. | 524/539 |
| 3,860,523 | 1/1975 | Petrow | 252/8.1 |
| 3,936,414 | 2/1976 | Wright et al. | 523/527 |
| 4,019,922 | 4/1977 | Whittum | 106/15 FP |
| 4,089,912 | 5/1978 | Levek | 252/8.1 |
| 4,182,799 | 1/1980 | Rodish | 521/98 |
| 4,230,821 | 10/1980 | Bertrand | 521/95 |
| 4,282,049 | 8/1981 | Morse | 156/62.2 |
| 4,282,138 | 8/1981 | Kuehn | 523/527 |
| 4,290,938 | 9/1981 | Miyake et al. | 523/527 |
| 4,360,455 | 11/1982 | Lindenschmidt | 525/356 |
| 4,362,585 | 12/1982 | de Antonis et al. | 156/62.2 |
| 4,367,315 | 1/1983 | Zwanepoel et al. | 523/527 |
| 4,377,506 | 3/1983 | Sprague | 524/405 |
| 4,409,344 | 10/1983 | Moulson et al. | 523/527 |

FOREIGN PATENT DOCUMENTS 1249735 11/1960 France .

*Primary Examiner*—Allan M. Lieberman
*Attorney, Agent, or Firm*—Body, Vickers & Daniels

[57] ABSTRACT

A strong, fiberglass reinforced plastic material with fire retardant additive for use as a traffic sign blank material is described. The material is formed from a well balanced mixture of unsaturated polyester resin, halogenated polyester resin, inorganic fire retardant filler, monomer cross-linking agent and fiberglass reinforcement.

20 Claims, No Drawings

FIBERGLASS REINFORCED PLASTIC SHEET MATERIAL WITH FIRE RETARDANT FILLER

This invention relates to the art of glass fiber reinforced plastics and more particularly to a reinforced plastic material with flame retardant additive capable of being formed into large rigid panels.

The invention is particularly applicable to material which is in the form of large panels for use as traffic signs or other traffic control structures and will be described with particular reference thereto, although it will be appreciated that the invention has broader applications and can be used whereever panels having high physical strength and good flame retardancy characteristics are required.

In the past, traffic signs and other traffic control products have been fabricated from thick sheets of aluminum. Aluminum has good strength characteristics, is light in weight and has good corrosion resistance. However, the price of aluminum fluctuates widely and on a square footage basis is frequently much more expensive than the equivalent price of glass fiber reinforced plastic material. Additionally, aluminum has a significant scrap value and is increasingly becoming the subject of theft by vandals who remove the traffic signs from their installed positions and sell the material as scrap. A further problem with aluminum signs is that they deform excessively when shot by vandals or passing hunters.

Proposals have been made in the past to substitute fiberglass reinforced plastic panels for aluminum. While many fiberglass reinforced panels have been successful in commercial sign applications, the Federal and State governments have been very reluctant to use fiberglass reinforced panels in traffic signs, one of the principal reasons being that most fiberglass reinforced plastic materials, if heated to an ignition temperature, vigorously burn, inviting torching of the signs by vandals.

While efforts have been made to reduce the flammability of the fiberglass materials employed, heretofore additives to the fiberglass resin which would reduce the flammability also reduced the physical strength characteristics of the resultant panel to the point where the panels were unsatisfactory for traffic sign use.

While flame or burn resistance is of prime importance, other physical characteristics of the panel are necessary if they are to adequately function in traffic signs, namely the ability to withstand high (85 mph) wind loads, resistance to vandalism, good weatherability, easy fabrication, no panel warpage, no delamination or migrating constituent and the capability of being recycled. Any one of these properties by itself is not unusual in glass fiber reinforced plastics but to have all of these properties in combination is a prime necessity in traffic control signs.

SUMMARY OF THE INVENTION

The present invention provides a reinforced plastic material which can be readily made into large flat panels which overcomes all of the above referred to problems and provides a panel having good physical and mechanical characteristics coupled with high flame retardancy characteristics.

In accordance with the present invention, a glass fiber reinforced plastic material with flame retardant additive is provided comprised of a cured mixture of a general purpose polyester resin, a halogenated polyester resin, catalyst, at least one monomer cross-linking agent, one or more inorganic fire retardant fillers and glass fibers.

These ingredients, in accordance with the invention, are present in a resinous composition in the following general proportion in parts by weight:
general purpose polyester resin 42.5 to 56.5
halogenated polyester resin 14.5 to 18.5
cross linking monomer 12.0 to 22.0
inorganic fire retardant filler 15.0 to 25.0

Basis 100 weight parts of this resinous composition, there is further combined with such composition up to about 3 weight parts of catalyst combination, together with from about 20 to about 30 weight parts of reinforcing fiberglass.

The material provides exceptionally strong, smooth, warp free fiberglass reinforced plastic sheets with fire retardant property. Production of a sheet having all these characteristics was simply not possible previously. Resins and fillers which improve flame retardancy usually resulted in panel warp and low mechanical properties in a thin sheet. Numerous formulations, tests and revisions were required to discover the correct mix of ingredients and proportions of ingredients which interact to provide all the required characteristics here.

It is the primary object of the present invention to provide a fiberglass reinforced plastic sheet material having high strength, dimensional stability, tough impact resistance, freedom from warpage, weather and corrosion resistance and flame retardant property.

It is another object of the present invention to provide a traffic sign material having low initial cost and low scrap value.

It is another object of the present invention to provide a fiberglass reinforced plastic substitute for aluminum sheet traffic sign material having good flame retardancy characteristics.

It is a further object of the present invention to provide fiberglass reinforced plastic sheet material having good adhesion characteristics such that it will accept and retain paints and adhesive bonded reflective materials and the like.

Another object of the present invention is to provide a traffic sign material which will not deform excessively when shot at with firearms.

Other objects, features and advantages of the present invention will become apparent from the detailed description of the preferred embodiment which follows.

DESCRIPTION OF THE PREFERRED EMBODIMENTS

In preparing the glass fiber reinforced plastic material with flame retardant additive there will first be produced the resinous composition. A principal constituent of this composition is an unsaturated polyester resin, which may also be referred to herein for convenience as the "general purpose" resin. This general purpose resin can be prepared from monomeric ingredients including maleic constituency, e.g., maleic anhydride, phthalic constituency such as phthalic acid and a glycol. For best physical properties in the plastic material it is advantageous that the glycol used be at least a $C_3$ glycol such as propylene glycol. Also, for preparing panels that will have retarded warp, it is advantageous to have the maleic constituency predominate over the phthalic constituency. Preferably, for best mechanical and physical properties in the final product, a general purpose resin will be selected that has a maleic to phthalic ratio of about 2 to 1. It is further most desirable to select a general purpose resin based upon propylene glycol, although higher molecular weight glycols can be included. It is further contemplated that those of lower molecular weight than propylene glycol can be included if the propylene or higher molecular weight glycols are present in great excess over those of lower molecular weight. The resin will contribute from about 42.5 weight parts to about 56.5 weight parts, to the 100 weight parts of the resinous composition. Use of less than about 42.5 weight parts is undesirable for obtaining best mechanical properties of finished product, while greater than about 56.5 weight parts can require deleterious cutback in amounts of further ingredients, such as those included for flame retardancy. Preferably, for a best balance of all ingredients plus the good mechanical properties contributed by the resin, such is present in an amount of about 49–50 weight parts, basis 100 weight parts of the resinous composition.

The next critical ingredient present in the resinous composition is the halogenated polyester resin. The halogens of this resin will most typically be chlorine and bromine or their mixture. Preferably for best flame retardance characteristic of the final product, bromine is the halogen of choice. Usually, the halogenated polyester resin selected will contain from about 20 to 25 weight percent of halogen. It is important for best flame retardance property of the final product that the polyester resin selected contribute at least 3.3 weight parts of halogen, and more preferably about 3.5 weight parts of bromine or more, per 100 weight parts of resinous composition. The halogenated polyester resin should be present in an amount contributing from about 14.5 weight parts up to about 18.5 weight parts, to the 100 weight parts of resinous composition. Use of less than about 14.5 weight parts can enhance mechanical properties of the final product, but at sacrifice to flame retardance characteristics, while the contrary is observed when greater than about 18.5 weight parts of the halogenated polyester resin is employed. Preferably, for best flame retardance property combined with enhanced mechanical properties, the polyester resin will be present in amount of about 16–17 weight parts, basis 100 weight parts of the resinous composition.

The next necessary ingredient for the resinous composition is the cross-linking monomer or "cross-linking agent." It is to be understood that a certain amount of monomer will typically be contributed to the resinous composition through the selection of the general purpose resin or the halogenated polyester resin or both. Commercially available resins of these types can be expected to contribute monomer to the final resin mixture. But for complete copolymerization as well as enhanced viscosity control, it is necessary to supply additive crosslinking agent to the resinous composition. An acrylic monomer will be used with methyl methacrylate monomer being preferred. It is also most advantageous for best processing control, although not critical, to include styrene monomer. The monomer cross-linking agent will contribute from about 12 weight parts up to about 22 weight parts to the resinous composition, basis 100 weight parts. When both the acrylic monomer as well as styrene monomer are present a fairly even balance between the two monomers is preferred for economy and efficient process control. Thus, when about 12 weight parts of agent is present, there will most always be contributed to this amount 6 weight parts of acrylic monomer and 6 weight parts of styrene monomer. Less than about 12 weight parts of total monomer is undesirable for achieving best viscosity control. On the other hand, greater than about 22 weight parts is unnecessary to affect efficient copolymerization and can detract from the presence of the flame retardant ingredients in sufficient amounts. When a monomer combination is present in the more elevated quantities, the styrene can predominate, for economy. Thus, about 12 weight parts of styrene plus about 10 weight parts of acrylate can be useful.

Another critical ingredient for the resinous composition is the inorganic fire retardant filler. Many such inorganic fire retardant fillers are known and, as will be recognized by those skilled in the art, can find use in the present invention. One group of such fillers of particular interest are the fillers that release water for fire retardancy, such as epsom salts. These water-releasing fillers, also termed herein "hydrous fillers" may include hydrated alumina. For the fire retardant filler, alumina trihydrate is preferred, whereby hydrated alumina is often merely referred to herein for convenience as "alumina trihydrate." The hydrated alumina is advantageously silicon treated before use, for example with a silane or a polysiloxane. For best fire retardance property, it is preferred that the hydrated alumina be a silane treated hydrated alumina.

The fire retardant filler should contribute to the resinous composition an amount from about 15 weight parts to about 25 weight parts, both basis 100 weight parts of such composition. The presence of less than about 15 weight parts will be insufficient to provide desirable flame retardance characteristic for the composition. The use of greater than about 25 weight parts can detract from the most desirable physical properties of the composition. When a combination of fire retardant filler is used and such combination includes a hydrous filler, the hydrous filler will generally be present in an amount of about 20 weight parts or less. It is preferred to use a hydrous filler in conjunction with a second inorganic filler.

The second filler will most always be present to achieve consistent flame retardant property in the final product. The second filler can be an antimony compound such as antimony oxide. Although not intending to be bound to any specific substance, the second filler will often be referred to herein as antimony trioxide. However, the use of other antimony substances are contemplated, e.g., sulfides of antimony as well as antimony salts of or acids such as antimony butyrate. It is preferred for best burn resistance to use the oxide. When present, the antimony compound should contribute from about 1 to about 5 weight parts, basis 100 weight parts resinous composition. A use of greater than about 5 weight parts is uneconomical while less than about 1 weight part will be insufficient for enhancing flame retardance. As mentioned before, the second inorganic filler will be used along with the hydrous filler and in combination there will most always be present about 1–weight parts of the second filler together with about 15–20 weight parts of the hydrous filler.

The general purpose resin, the halogenated polyester resin, the monomer cross-linking agent and the inorganic fire retardant filler then complete the critical ingredients for the 100 weight parts basis of the resinous composition. However, other critical ingredients are further combined with such resinous composition. One of these further critical ingredients is the catalyst component. As used, this component will supply catalyst, often in combination, which can add as much as about 3 weight parts of catalyst onto 100 weight parts of the resinous composition. Although any number of a variety of catalysts may be used, as will be well recognized by one skilled in the art, it has been found most advantageous to employ a combination of catalysts. Of particular interest is the combination of cumene hydroperoxide and t-butyl peroctoate. Typically, about a 50 weight percent excess of the t-butyl peroctoate will be used in the preferred combination.

Another critical ingredient for the reinforced material, but not contributing to the 100 weight parts of resinous composition, is the fiberglass reinforcing material. The fiberglass will usually be supplied as bundled filaments chopped to short lengths on the order of 1.5 to 2.5 inches or so. It is preferable for best dispersion of the chopped fiberglass in the resinous composition that a coated fiberglass be used. Such reinforcing material will add from about 20 to about 30 weight parts, added to the 100 weight parts of the basis resinous composition. Preferably for best physical properties of finished articles, about 24–26 weight parts of fiberglass reinforcing material is added.

In addition to the ingredients for the resinous composition, plus the other critical ingredients, additional substances are useful, some of which will most always be present. These however, will be employed in addition to the foregoing discussed ingredients.

One such additional ingredient is wetting agent. Although such agent can be present in only a very minor amount, such amount may be all that is needed for providing complete filler dispersion in the resinous composition. For purposes of the present invention, a hydrophobic wetting agent is used. It is present in the composition to contribute an amount from about 0.01 to 0.1 weight part, basis 100 parts of the composition. A use of less than about 0.01 weight part will simply be insufficient to contribute to best filler dispersion while greater than about 0.1 weight part is uneconomical.

Another additional ingredient most always included is an ultraviolet light (U.V.) stabilizer substance. It is to be understood that the discussion herein with reference to such substance is in conjunction with its use beyond that which may be contributed by the general purpose resin and/or halogenated polyester resin. These resins, as commercially prepared, will often contain some minor amount of U.V. stabilizer substance, e.g., 0.2 to 0.5 weight percent, basis weight of the individual resin. Taking into account that each of the general purpose resin and halogenated polyester resin can contribute up to about 0.5 weight percent of ultraviolet light stabilizer substance, there is preferably added an additional amount of such substance, such that the total of all such contributions will provide up to about 2 weight parts of stabilizer, basis 100 weight parts of the resinous composition. Greater than about 2 weight parts will simply be uneconomical and not contribute further desirable ultraviolet light stabilization. When additional stabilizer is used, it will usually be supplied in an amount of at least about 0.25 weight part to contribute sufficient enhancement and stabilization to the resinous composition.

In addition to the foregoing, the composition may further include optional ingredients such as pigments, which should be non-metallic for best fire retardance property, as well ad dyes, optical brighteners, anti-oxidants and additional fillers, e.g., clay filler including reinforcing fillers, and the like. When such ingredients are employed, it is desirable that they not contribute greater than about 8 weight parts or so of the composition, basis 100 weight parts of resinous composition. The following example shows a way in which the invention has been practiced, but should not be construed as limiting the invention. In the example, all parts are parts by weight, unless otherwise specified.

EXAMPLE

The following ingredients, in the weight parts as shown, are blended together:

| | |
|---|---|
| Unsaturated Polyester Resin* | 49.5 |
| Halogenated Polyester Resin** | 16.5 |
| Methyl Methacrylate Monomer | 6.0 |
| Styrene Monomer | 8.0 |
| Benzotriazole | 0.25 |
| Wetting Agent+ | 0.1 |
| Cumene Hydroperoxide | 0.8 |

*RCI-98-498 resin from Reichhold Chem. Co.
**Koppers 6131 Resin containing 23 weight percent bromine.
+Byk Mallinckrodt BYK-980

The resins, then the monomers are initially blended together. As blending continues, there is then admixed to this blend the benzotriazole U.V. stabilizer and next the wetting agent.

As mixing continues, the temperature of the mixture is raised to about 95° F. and the following ingredients are added, parts being parts by weight:

| | |
|---|---|
| Alumina Trihydrate* | 16 |
| Antimony Oxide | 4 |

*Silane-treated, SOLEM SB-335 HYFLEX.

The full blend is subjected to high shear mixing, under vacuum, to remove entrained air and gases. The mixture is then ready for addition of a first catalyst, 0.8 parts by weight of cumene hydroperoxide, and, a second catalyst, t-butyl peroctoate, which is added in amount contributing an additional 1.25 parts to the full blend. The resulting catalyzed resin is then ready for further processing. Such processing will usually be for the preparation of resin panels using a continuous carrier film, or on a belt. More specifically, with this catalyzed resin it is first deposited on a carrier film. Glass fibers are then placed on the resin layer, there being used in this application 25 weight parts of such fibers per 100 parts of the fully blended resin mixture. The resulting composite, on the carrier film, is passed between a roller and in contact with a second moving film, whereby the composite travels forward between the carrier film and the second film. It proceeds through a heating zone to cure the resin while so confined. After proceeding through the heating zone, the cured resin can be separated from its enclosure by bending each film away from the resin. The emerging cured resin can then be cut into suitable sizes to be subsequently used as panels.

Preferred ingredient proportions and ranges of proportions have been set forth. Of course, changing the proportion of one ingredient, even within the ranges set forth, may require adjustment of the proportions used of other ingredients.

The invention has been described with reference to the preferred embodiment. Obviously, modifications and alterations will occur to others upon the reading and understanding of this specification. It is intended to include all such modifications and alterations insofar as they come within the scope of the appended claims or the equivalent thereof.

What is claimed is:

1. A fiberglass reinforced rigid panel with fire retardant property, said panel being comprised of fiberglass reinforcement embedded in a resinous composition having a constituency comprising, in parts by weight basis 100 total weight parts of said resinous composition:

| | |
|---|---|
| unsaturated polyester resin | 42.5–56.5 parts |
| halogenated polyester resin | 14.5–18.5 parts |
| monomer cross-linking agent | 12.0–22.0 parts |
| inorganic fire retardant filler | 15.0–25.0 parts | and with there being further combined with said resinous composition up to about 3 weight parts of a catalyst combination, together with from about 20 to about 30 weight parts of reinforcing fiberglass, both added to 100 weight parts of said resinous composition, said unsaturated polyester resin being prepared using glycols comprising primarily propylene glycol and glycols of higher molecular weight and said halogenated polyester resin contributing at least about 3.3 weight percent of halogen to said resinous composition.

2. The panel of claim 1, wherein said unsaturated polyester resin is the reaction product of a maleic constituency, a phthalic constituency and propylene glycol.

3. The panel of claim 2, wherein said unsaturated polyester resin has a maleic constituency predominating over the phthalic constituency.

4. The panel of claim 1, wherein said halogenated polyester resin contains halogen selected from the group consisting of chlorine, bromine and their mixtures.

5. The panel of claim 1, wherein said halogenated resin contains above 20 weight percent bromine and said bromine contributes at least about 3.3 weight percent of bromine to said resinous composition.

6. The panel of claim 1, wherein said monomer cross-linking agent is a combination of agents including acrylic and styrene monomers.

7. The panel of claim 6, wherein said monomer cross-linking agent includes methyl methacrylate and styrene monomer there being at least 6 weight parts of each monomer, combination 100 weight parts of said resinous composition.

8. The panel of claim 1 wherein said inorganic fire retardant filler includes hydrous filler.

9. The panel of claim 8, wherein said hydrous filler is a treated alumina.

10. The panel of claim 9 wherein said treated filler is treated with substance selected from the group consisting of silane, polysiloxane, and their mixtures.

11. The panel of claim 9, wherein said hydrous filler is present in an amount from about 15 to about 20 weight parts, and said inorganic fire retardant filler further includes antimony compound which is present in an amount from about 1 to about 5 weight parts, both basis 100 weight parts of said resinous composition.

12. The panel of claim 11, wherein said antimony compound is an antimony oxide.

13. The panel of claim 1, wherein said resinous composition includes from about 0.01 to about 0.1 weight parts of wetting agent, basis 100 weight parts of said composition.

14. The panel of claim 13, wherein said wetting agent is a hydrophobic wetting agent.

15. The panel of claim 1, wherein said resinous composition additionally contains up to about 2 weight parts, basis 100 weight parts of said composition, of ultraviolet light stabilizer substance.

16. The panel of claim 15, wherein said stabilizer substance is selected from the group consisting of benzotriazole, triphenyl phosphite, dibutyl phosphite, phenyl salicylate, 2,4-dihydroxy-benzophenone and their mixtures.

17. The panel of claim 1, wherein said resinous composition is in mixture with up to about 3 weight parts of a catalyst combination containing cumene hydroperoxide and t-butyl peroctoate.

18. The panel of claim 1, wherein said fiberglass reinforcement is chopped fibers.

19. A fiberglass reinforced plastic panel with fire retardant property, comprising fiberglass reinforcement embedded in a cured resin formed of at least one catalyst and a resin composition comprised of the following ingredients in the weight proportions set forth:

| | |
|---|---|
| halogenated polyester resin | 14.5–18.5 parts |
| unsaturated polyester resin | 42.5–56.5 parts |
| hydrous fire retardant filler | 15.0–20.0 parts |
| monomer cross-linking agent | 12.0–22.0 parts |
| fire-retardant antimony compound | 1.0–5.0 parts |
| hydrophobic wetting agent | 0.01–0.1 part |
| fiberglass reinforcement | 23–28 parts | said unsaturated polyester resin being prepared using glycols comprising primarily propylene glycol and glycols of higher molecular weight and said halogenated polyester resin contributing at least about 3.3 weight percent of halogen to said resinous composition.

20. The panel of claim 19 wherein said halogenated polyester resin is a brominated resin and said hydrous fire retardant filler is silane treated alumina trihydrate.

* * * * *